Patented Nov. 10, 1942

2,301,799

UNITED STATES PATENT OFFICE 2,301,799

PHENOL FORMALDEHYDE RESIN COMPOSITION

Wesley R. Thompson, Metuchen, N. J., assignor to Catalin Corporation of America, a corporation of Delaware No Drawing. Application February 24, 1940, Serial No. 320,702

7 Claims. (Cl. 260—34)

This invention relates to phenol formaldehyde resins and more particularly to the modification of such resins with certain esters that have been found to effect marked advantageous changes in the physical characteristics of the resin including translucency, machineability and aging properties.

In accordance with my invention I have discovered that when water soluble esters formed from monobasic monohydroxy lower aliphatic acids and low molecular weight monohydric aliphatic alcohols described below, are incorporated in a water solution of the phenol formaldehyde resin (usually a hydrophilic sol containing a substantial amount of water) and the resin and ester solution is then hardened and cured, that unique effects are imparted to the resin by the coaction of the ester with the other resin components. One of the principal changes in physical characteristics of the resin caused by the ester is in the translucency of the resin. For example, resins which would otherwise be chalk-white and substantially opaque can be changed to a translucent porcelain white resin by the modification of the resin with one of these esters.

Another advantageous change brought about by the use of the ester in these resins is the very marked improvement in the drilling and general machining properties of the resin. Resins which normally require heating to something over 100° F. to be drilled, may be drilled at the normal room temperatures if they have been modified with one of these esters.

A further improvement imparted to the resin by the use of the ester is the aging quality of the resin. Cured resins containing the ester will not crack and craze in accordance with their normal tendencies. In a number of resins made heretofore glycerol and similar plasticizers have been used for softening the resin. However, it has been found that when these resins are cured at an elevated temperature and subsequently cooled to room temperature, strains and stresses are introduced which eventually cause cracking. One possible explanation of this is the relatively high coefficient of expansion of the glycerine. I have found that if one of the above defined esters is used in accordance with my invention it does not cause the resin to crack and in fact prevents cracking in a resin which would otherwise be subject to this characteristic. I am not sure whether this improvement in aging properties is brought about by a different coefficient of expansion of the special ester from the substances heretofore used, but I believe that this plays some part in producing the desired result.

With regard to the translucency effects produced by the ester even when used in relatively very small amounts based on the total weight of the resin, I believe that this is due at least in part to the refractive index value of the ester used. The water which is present in considerable amount in the hydrophilic resins that I employ has a refractive index of about 1.33 whereas the refractive index of the resin solute is substantially higher than this value and usually about 1.58 or the like. The refractive indices of the esters which I use are generally above that of water, that is above 1.33 and generally not greater than the refractive index of the resin. The esters which I have found to give very satisfactory results have refractive indices of around 1.4 to 1.5, although I do not intend to limit my invention to any specific refractive index range or the effect thereof on the resin. The actual fact is that when the ester is used in the resin in accordance with my invention the resin is made substantially more translucent.

The esters which I have found to give good results and produce the above described improvements in the resin are the esters of the monobasic monohydric lower aliphatic acids produced by combining such acids with monohydric aliphatic alcohols containing not more than 3 carbon atoms. Specifically, the esters employed are preferably methyl, ethyl and propyl (including iso-propyl) esters of lactic acid and I also may use the corresponding esters of alpha hydroxy isobutyric acid. The esters employed should be high boiling and also should be water soluble and compatible with the resin to bring about the desired improvements.

One of the commercial problems which involve the machineability of the resin is the use of the resin for the backs of brushes; in other words, a resin which is used to form a base into which the brush bristles usually in groups, are inserted. This filling of the brush stock requires a series of holes to be drilled in the resin brush back. The usual form of resin used heretofore for this purpose could not be drilled without first heating the resin to effect softening and overcoming its natural fracture characteristics. This heating step is bothersome in large production manufacture and adds materially to the cost of the finished product. When the same form of resin is used and a small amount of one of the above named esters is incorporated, the resin can be drilled at room temperatures and thereby avoid the necessity of any heat treatment prior to drilling.

The amount of ester to be used in the resin will vary substantially with different forms of resins and with the desired amount of translucency to be obtained in the final product. A broad range of suitable amounts of the ester is about 1% to 15% of ester based on the total solid content of the resin. In the usual case the amount of ester used will range from about 3% to 6%.

The ester may be added to the resin at any suitable point in the manufacture of the resin although it is preferable to introduce the ester after the heat treatments of the resin required for condensation and dehydration have been completed or substantially completed, so as to effect as little loss as possible of the ester by evaporation. In the usual case I have found it advantageous to add the esters such as for example, ethyl lactate, after the resin has been dehydrated down to the desired point. In a typical example the resin base after condensation is dehydrated under vacuum to a point where the resin will just crack when put in cold water at about 11° C. and after this stage is reached the ethyl lactate in desired amount is incorporated and thoroughly mixed with the other constituents, after which the resin is ready for pouring.

One of the practical advantages of the use of the esters such as ethyl lactate over glycerine and similar substances used heretofore, is that the ester is of low consistency and helps to thin the dehydrated resin. The resin so treated may then be poured more easily for casting.

Illustrative but non-limiting examples of the resin formulas which may be used in my invention are as follows:

Example I

| | Parts |
|---|---|
| Phenol | 1.000 |
| Formaldehyde 37% | 2.000 |
| Sodium hydroxide | .0100 |
| Phthalic anhydride | .0259 |
| Lactic acid | .01350 |
| Glycerine | .05067 |
| Ethyl lactate | .0600 |

Example II

| | |
|---|---|
| Phenol | 1.000 |
| Formaldehyde | 1.875 |
| Potassium hydroxide | 0.025 |
| Phthalic anhydride | 0.039 |
| Glycerine | 0.078 |
| Ethyl lactate | 0.035 |
| Lactic acid | 0.0125 |

Example III

| | |
|---|---|
| Phenol | 1.000 |
| Formaldehyde | 2.027 |
| Sodium hydroxide | .040 |
| Lactic acid | .11125 |
| Ethyl lactate | .12000 |

One of the important advantages obtained from the use of ethyl lactate in the above resin formulas is that it permits the substantial reduction in amount, and even in some cases, total elimination of the glycerine which is normally used in these resins. As indicated above the glycerine is believed to set up stresses and strains in the resin as it contracts to the normal room temperature. Replacement of this glycerine in whole or in substantial part by ethyl lactate has been found to improve substantially the aging properties of the resin. In fact in a number of cases the use of the ethyl lactate has substantially eliminated all cracking of the resin.

A typical procedure for the preparation of a resin from one of the above formulas is as follows:

The phenol and formaldehyde are reacted at the boiling point with the sodium hydroxide for about 30 minutes. Then the phthalic anhydride and glycerine, if any are used, are added to the hot alkaline resin and lower the pH to about 5. The lactic acid is then added, or is added directly to the alkaline resin solution if no phthalic anhydride and glycerine are used as in Example III above, and causes the pH of the resin to be lowered to about 4 to 4.5. The resin is then dehydrated under vacuum or until a sample is firm when cooled to 11° C. The ethyl lactate or similar lactate is now intimately incorporated into the resin solution and the latter is then ready for hardening.

The ethyl lactate or similar ester used in my invention may be incorporated in the above procedure at several different stages. For example, the ethyl lactate in an amount of about 5% may be added at the completion of the process by stirring the ethyl lactate into the hot resin sufficient to effect complete homogeneity and then the resin and ethyl lactate solution poured into hot molds. Another procedure is to add the ethyl lactate directly after the resin has been acidified as described above with lactic acid. A third procedure is to add the ethyl lactate after the resin has been partially, but not fully dehydrated.

The resins preferred for use in this invention are the phenol formaldehyde resins having a ratio of about 1 mol of phenol to 1.5 to 3 mols (and preferably between 2 and 3 mols) of formaldehyde, and which have been condensed in the presence of an alkaline catalyst followed by neutralization of the excess alkali with an organic acid and finally dehydrated down to a point where the resin contains a suitable amount of water such as for example, 5% to 12%. These resins prior to curing are hydrophilic and are in substantially colloidal solution with the water present; that is, the resin upon completion of the dehydration is in the form of a hydrophilic sol. Upon heating of this sol the resin gels with a porous structure, in which the water present is colloidally dispersed throughout this cellular structure. Upon final heating and cooling this resin gel is hardened and still contains the colloidal droplets of water entrapped in the cellular mass of resin.

While I do not wish to limit my invention to any theory or explanation of how the ester functions to produce the above described improvements, I offer the following theoretical discussion and explanation in the light of the actual experience gained in laboratory and commercial use of the invention. I believe that it will give a clearer understanding of the basic features of the invention and perhaps a better insight into the causes for the improvements obtained.

I believe that the ester, e. g. ethyl lactate, materially influences the colloidal structure of the constituent units of the resin in the sol state, thus influencing the sol-gel transformation in such a manner that a gel structure of high mechanical qualities is obtained yielding a more homogeneous molecular arrangement in the final products.

Similar conditions to those produced by the addition of ethyl lactate to a resin solution are often encountered in colloidal chemistry. The phenomenon, which plays the most important part under such conditions is generally known as "oriented absorption." For example, in considering an oil in water emulsion to which a soap solution is added, we are dealing with a system consisting of dispersed oil particles (the dispersed phase), water (dispersion medium) and soap molecules being partly soluble in oil and partly in water. Soap molecules are considered as little rods. As one end, they carry the carboxyl groups (COOH) whereas at the other end, they carry the hydrocarbon. In the interface between oil and water (as a colloidal system it is characterized by extreme development of surfaces and surface boundaries), these molecules are more or less closely packed in such a way that the hydrophilic groups (such as COOH) are located in the direction of the water phase; the organic radical in the direction of the oil phase. According to the Hardy-Harkin's theorem, the molecular arrangement in the interface will always be such that the transition to the neighboring phase is the least abrupt possible.

It is most likely that the advantageous effects of ethyl lactate are due to the fact that ethyl lactate or other similar esters function in the resin solution similarly to soap molecules in the case of an oil in water emulsion. Regarding the relations between sol-gel structure and mechanical properties, it can readily be understood that the influence of oriented absorption on the structure of the resin must lead to improved mechanical properties.

In general oriented absorption is brought about by soluble substances which, when added to a liquid-liquid system, materially alter its surface tension. Such substances must concentrate in the surface layer, the reason being that the one end of the added molecules will have more attractive forces for the dispersed substance (e. g. oil or resin), the other end more attractive forces for the dispersion medium (water). This must result in an increased lowering of surface tension with increased surface concentration. Oriented absorption is obtainable only with substances possessing molecules which, like the soaps and higher fatty acids, have partial solubility; i. e. their hydrocarbon end is soluble in organic liquids, but insoluble or less soluble in water; their carboxyl or equivalent group, easily soluble in water, but more or less insoluble in organic liquids.

The foregoing may explain why glycerol does not exhibit the same effect as the ethyl lactate. That is, the glycerol molecule does not consist of parts with different attractive forces for the dispersed resin particles on the one hand and the dispersion medium on the other. It has, therefore, no partial solubility and is not able to give an oriented absorption.

To give a simple picture, substances like ethyl lactate can be thought of as holding together the dispersed resin particles and the surrounding parts of the dispersion medium, acting, to some extent, like an emulsifier, thus homogenizing the molecular arrangement and, probably retarding the gelation period which eventually results in a structure of higher elasticity.

Numerous modifications and changes in the materials and procedures described hereinabove will occur to those skilled in the art and are intended to be included in the scope of the following claims.

I claim:

1. A translucent phenol formaldehyde resin that is capable of being drilled and machined at room temperatures without fracturing, resulting from the reaction of about 1 mol of phenol with from 1.5 to 3 mols of formaldehyde, and that has a substantial amount of water colloidally dispersed throughout the resin, and which includes within its solid structure from about 1% to 15% of an ester formed from a monohydric aliphatic alcohol containing not more than 3 carbon atoms selected from the group consisting of methyl alcohol, ethyl alcohol, propyl alcohol and isopropyl alcohol and an acid selected from the group consisting of lactic acid and alpha hydroxy isobutyric acid, said ester being water soluble, compatible with the resin and being one which coacts with the resin to produce translucency therein and to improve substantially the machineability of the resin.

2. A phenol formaldehyde resin as defined in claim 1 in which the ester used is ethyl lactate.

3. A phenol formaldehyde resin as defined in claim 1 in which the ester used is methyl lactate.

4. A phenol formaldehyde resin as defined in claim 1 in which the ester used is isopropyl lactate.

5. The method of producing a resin from a sol comprising water and the hydrophilic reaction products of from 1.5 to 3 mols of formaldehyde with 1 mol of phenol, which comprises incorporating with such sol from about 1% to 15% of an ester formed from a monohydric aliphatic alcohol containing not more than 3 carbon atoms selected from the group consisting of methyl alcohol, ethyl alcohol, propyl alcohol and isopropyl alcohol and an acid selected from the group consisting of lactic acid and alpha hydroxy isobutyric acid and then causing such sol to gel and harden under the influence of heat.

6. A process as specified in claim 5, in which the ester is present in a proportion of from about 3% to 6%.

7. A translucent phenol-formaldehyde resin that is capable of being drilled and machined at room temperature without fracturing, having the structure and composition of a resin resulting from the reaction of from 1.5 to 3 mols of formaldehyde with one mol of phenol to form a sol with water with which there has been incorporated between 1% and 15% of an ester formed from a monohydric alcohol containing not more than 3 carbon atoms selected from the group consisting of methyl alcohol, ethyl alcohol, propyl alcohol and isopropyl alcohol and an acid selected from the group consisting of lactic acid and alpha hydroxy isobutyric acid, and which has been hardened by heating with such ester incorporated in the mass.

WESLEY R. THOMPSON.